(12) United States Patent
Zhao et al.

(10) Patent No.: US 12,452,914 B2
(45) Date of Patent: Oct. 21, 2025

(54) RANDOM ACCESS METHOD AND APPARATUS

(71) Applicant: Huawei Technologies Co., Ltd., Shenzhen (CN)

(72) Inventors: Li Zhao, Shanghai (CN); Chunhua You, Shanghai (CN); Chong Lou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 386 days.

(21) Appl. No.: 17/740,053

(22) Filed: May 9, 2022

(65) Prior Publication Data
US 2022/0279591 A1 Sep. 1, 2022

Related U.S. Application Data

(63) Continuation of application No. PCT/CN2019/116425, filed on Nov. 7, 2019.

(51) Int. Cl.
*H04W 74/0833* (2024.01)
*H04W 74/0808* (2024.01)
(52) U.S. Cl.
CPC ... *H04W 74/0833* (2013.01); *H04W 74/0808* (2013.01)
(58) Field of Classification Search
None
See application file for complete search history.

(56) References Cited

U.S. PATENT DOCUMENTS

| | | | |
|---|---|---|---|
| 2019/0223255 A1* | 7/2019 | Jeon | H04W 88/023 |
| 2020/0154480 A1* | 5/2020 | Jose | H04W 74/0825 |
| 2021/0212112 A1* | 7/2021 | Jia | H04W 56/001 |
| 2022/0346174 A1* | 10/2022 | Wang | H04W 74/0808 |
| 2022/0369139 A1* | 11/2022 | Wang | H04W 36/305 |

FOREIGN PATENT DOCUMENTS

| | | |
|---|---|---|
| CN | 103200663 A | 7/2013 |
| CN | 108811119 A | 11/2018 |
| WO | 2019158366 A1 | 8/2019 |

OTHER PUBLICATIONS

Samsung, "2 step RA: RA Prioritisation," 3GPP TSG-RAN2 107bis, Chongqing, China, R2-1912431, Oct. 18, 2019, total 3 pages, 3rd Generation Partnership Project, Valbonne, France (Oct. 14-18, 2019).

(Continued)

*Primary Examiner* — Srinivasa R Reddivalam
(74) *Attorney, Agent, or Firm* — Leydig, Voit & Mayer, Ltd.

(57) ABSTRACT

A random access method and apparatus are provided. The method includes: A terminal device receives first information sent by a network device, wherein the first information includes a priority value of a first parameter used for a random access procedure. The terminal device initiates the random access procedure based on the priority value. According to the application, the terminal device can preferentially select, based on the priority value of the first parameter, a two-step random access procedure or send a message in the random access procedure by using high power, to quickly access a network and reduce an access delay.

12 Claims, 4 Drawing Sheets

300

S310: A counter #1 for a bandwidth A reaches a first value

S320: Switch an active bandwidth to a bandwidth B

S330: Initiate a random access procedure B

(56) References Cited

OTHER PUBLICATIONS

Vivo, "Prioritized RA parameters for 2-step RACH," 3GPP TSG-RAN WG2 Meeting #106, R2-1905657 (Revision of R2-1903076), May 17, 2019, total 2 pages, 3rd Generation Partnership Project, Valbonne, France (May 13-17, 2019).

Ericsson, "2-step RA 38.331 Draft CR," 3GPP TSG-RAN WG2 #107bis, Chongqing, P.R. China, Tdoc R2-1912683, Oct. 18, 2019, total 12 pages, 3rd Generation Partnership Project, Valbonne, France (Oct. 14-18, 2019).

"3rd Generation Partnership Project; Technical Specification Group Radio Access Network; NR; User Equipment (UE) radio transmission and reception; Part 1: Range 1 Standalone (Release 16)," 3GPP TS 38.101-1 V16.1.0, total 280 pages, 3rd Generation Partnership Project, Valbonne, France (Sep. 2019).

"3rd Generation Partnership Project; Technical Specification Group Radio Access Network; NR; Multiplexing and channel coding (Release 15)," 3GPP TS 38.212 V15.7.0, total 101 pages, 3rd Generation Partnership Project, Valbonne, France (Sep. 2019).

"3rd Generation Partnership Project; Technical Specification Group Radio Access Network; NR; Physical layer procedures for control (Release 15)," 3GPP TS 38.213 V15.7.0, total 108 pages, 3rd Generation Partnership Project, Valbonne, France (Sep. 2019).

"3rd Generation Partnership Project; Technical Specification Group Radio Access Network; NR; NR and NG-RAN Overall Description; Stage 2 (Release 15)," 3GPP TS 38.300 V15.7.0, total 99 pages, 3rd Generation Partnership Project, Valbonne, France (Sep. 2019).

"3rd Generation Partnership Project; Technical Specification Group Radio Access Network; NR; Medium Access Control (MAC) protocol specification (Release 15)," 3GPP TS 38.321 V15.7.0, total 78 pages, 3rd Generation Partnership Project, Valbonne, France (Sep. 2019).

"3rd Generation Partnership Project; Technical Specification Group Radio Access Network; NR; Radio Resource Control (RRC) protocol specification (Release 15)," 3GPP TS 38.331 V15.7.0, total 527 pages, 3rd Generation Partnership Project, Valbonne, France (Sep. 2019).

"Detecting and Handling of UL LBT failures," 3GPP TSG-RAN WG2 107bis, Chongqing, China, R2-1912625, Total 5 pages, 3rd Generation Partnership Project, Valbonne, France (Oct. 14-18, 2019).

"UL LBT failure," 3GPP TSG-RAN WG2 Meeting 107bis, Chongqing, China, R2-1913029, Total 3 pages, 3rd Generation Partnership Project, Valbonne, France (Oct. 14-18, 2019).

"Handling LBT failures," 3GPP TSG-RAN WG2 #107bis, Chongqing, China, Tdoc R2-1913504 (Revision of R2-1910779), Total 7 pages, 3rd Generation Partnership Project, Valbonne, France (Oct. 14-18, 2019).

Ericsson, "Random Access Fallback to Sul," 3GPP Tsg-Ran WG2 Meeting NR AdHoc#1801, Vancouver, Canada, R2- 1800687, Total 5 p. 3rd Generation Partnership Project, Valbonne, France (Jan. 22-26, 2018).

* cited by examiner

300

RANDOM ACCESS METHOD AND APPARATUS

CROSS-REFERENCE TO RELATED APPLICATIONS

This application is a continuation of International Application No. PCT/CN2019/116425, filed on Nov. 7, 2019, the disclosure of which is hereby incorporated by reference in its entirety.

TECHNICAL FIELD

Embodiments of this application relate to the communication field, and more specifically, to a random access method and apparatus.

BACKGROUND

The 3rd Generation Partnership Project (3GPP) approved a proposal of supporting a two-step random access procedure in Release 16 (Rel. 16) of a 5th generation (5G) communication system. To be specific, a terminal device accesses a network device by performing a two-step procedure in which the terminal device sends a first-step message and the network device sends a second-step message to respond to the first-step message sent by the terminal device. However, how the two-step random access procedure works in the 5G communication system is unclear. This is an urgent problem to be resolved by a person skilled in the art.

SUMMARY

This application provides a random access method and apparatus, so that a terminal device can quickly access a network.

According to a first aspect, a random access method is provided. The method may be performed by a terminal device or a module (for example, a chip) configured in the terminal device. An example in which the method is performed by the terminal device is used for description below.

The method includes: The terminal device receives first information sent by a network device, where the first information includes a priority value of a first parameter used for a random access procedure. The terminal device initiates the random access procedure based on the priority value.

According to the solution of this application, the terminal device can preferentially select, based on the priority value of the first parameter, a two-step random access procedure or send a message in the random access procedure by using high power, to quickly access a network and reduce an access delay.

With reference to the first aspect, in some implementations of the first aspect, the first parameter includes one or more of the following: a maximum transmission count of a first message, an uplink shared channel PUSCH power ramping step, or a reference signal received power threshold.

With reference to the first aspect, in some implementations of the first aspect, the method further includes: The terminal device determines whether the priority value of the first parameter is configured. That the terminal device initiates the random access procedure based on the priority value includes: The terminal device initiates the random access procedure based on the priority value when a determining result is yes; or the terminal device initiates the random access procedure based on a first value of the first parameter when the terminal device determines that the priority value is not configured, where the first value of the first parameter is used for a non-preferred random access procedure.

According to the solution of this application, the priority value is an optional configuration parameter. When the priority value is configured, the terminal device initiates the random access procedure by using the priority value, to quickly access the network and reduce the delay.

With reference to the first aspect, in some implementations of the first aspect, the first parameter includes the maximum transmission count of the first message, and the first message is a message sent in a first step in a two-step random access procedure. That the terminal device initiates the random access procedure based on the priority value includes: The terminal device initiates the two-step random access procedure after determining that a transmission count of the first message is less than or equal to a priority value of the maximum transmission count of the first message; or the terminal device initiates a four-step random access procedure after determining that a transmission count of the first message is greater than a priority value of the maximum transmission count of the first message.

According to the solution of this application, the network device configures the priority value of the maximum transmission count of the first message for the terminal device, so that the terminal device can access the network by using the two-step random access procedure when the transmission count of the first message is within a range of the priority value, to quickly access the network and reduce the delay.

With reference to the first aspect, in some implementations of the first aspect, the first parameter includes the uplink shared channel PUSCH power ramping step, the PUSCH power ramping step is used by the terminal device to increase transmit power of a PUSCH included in the first message, and the first message is the message sent in the first step in the two-step random access procedure. That the terminal device initiates the random access procedure based on the priority value includes: The terminal device sends the PUSCH by using a sum of a power value of a PUSCH included in a first message sent last time and a priority value of the PUSCH power ramping step as power of the PUSCH.

According to the solution of this application, the network device configures the priority value of the PUSCH power ramping step for the terminal device, so that the terminal device can perform power ramping on the PUSCH based on the priority value, to quickly access the network and reduce the delay.

With reference to the first aspect, in some implementations of the first aspect, the first parameter includes the reference signal received power threshold. That the terminal device initiates the random access procedure based on the priority value includes: The terminal device initiates the two-step random access procedure after determining that reference signal received power is greater than a priority value of the reference signal received power threshold; or the terminal device initiates the four-step random access procedure after determining that reference signal received power is less than or equal to a priority value of the reference signal received power threshold.

According to the solution of this application, the network device configures the priority value of the reference signal received power threshold for the terminal device, so that the terminal device can preferentially access the network by using the two-step random access procedure, to quickly access the network and reduce the delay.

With reference to the first aspect, in some implementations of the first aspect, the random access procedure is used for beam failure recovery or switching.

According to the solution of this application, in a beam failure recovery scenario or a switching scenario, the random access procedure is initiated by using the priority value of the first parameter, so that the terminal device can quickly recover a network connection or quickly switches to another cell.

According to a second aspect, a random access method is provided. The method may be performed by a network device or a module (for example, a chip) configured in the network device. An example in which the method is performed by the network device is used for description below.

The method includes: The network device sends first information to a terminal device, where the first information includes a priority value of a first parameter used for a random access procedure. The network device receives a message sent by the terminal device in the random access procedure.

With reference to the second aspect, in some implementations of the second aspect, the first parameter includes one or more of the following: a maximum transmission count of a first message, an uplink shared channel PUSCH power ramping step, or a reference signal received power threshold.

With reference to the second aspect, in some implementations of the second aspect, the first parameter includes the maximum transmission count of the first message, the first message is a message sent in a first step in a two-step random access procedure, and the maximum transmission count of the first message is used by the terminal device to choose to initiate the two-step random access procedure or a four-step random access procedure.

With reference to the second aspect, in some implementations of the second aspect, the first parameter includes the uplink shared channel PUSCH power ramping step, the PUSCH power ramping step is used by the terminal device to increase transmit power of a PUSCH included in the first message, and the first message is the message sent in the first step in the two-step random access procedure.

With reference to the second aspect, in some implementations of the second aspect, the first parameter includes the reference signal received power threshold, and the reference signal received power threshold is used by the terminal device to choose to initiate the two-step random access procedure or the four-step random access procedure.

With reference to the second aspect, in some implementations of the second aspect, the random access procedure is used for beam failure recovery or switching.

According to a third aspect, a communication apparatus is provided. The apparatus may be configured in a terminal device or the apparatus is the terminal device, and includes: a transceiver unit, configured to receive first information, where the first information includes a priority value of a first parameter used for a random access procedure; and a processing unit, configured to initiate the random access procedure based on the priority value.

With reference to the third aspect, in some implementations of the third aspect, the first parameter includes one or more of the following: a maximum transmission count of a first message, an uplink shared channel PUSCH power ramping step, or a reference signal received power threshold.

With reference to the third aspect, in some implementations of the third aspect, the processing unit is further configured to determine whether the priority value of the first parameter is configured. The initiating the random access procedure based on the priority value includes: The processing unit initiates the random access procedure based on the priority value when a determining result is yes; or the terminal device initiates the random access procedure based on a first value of the first parameter when determining that the priority value is not configured, where the first value of the first parameter is used for a non-preferred random access procedure.

With reference to the third aspect, in some implementations of the third aspect, the first parameter includes the maximum transmission count of the first message, and the first message is a message sent in a first step in a two-step random access procedure. The initiating the random access procedure based on the priority value includes: The processing unit initiates the two-step random access procedure after determining that a transmission count of the first message is less than or equal to a priority value of the maximum transmission count of the first message; or the processing unit initiates a four-step random access procedure after determining that a transmission count of the first message is greater than a priority value of the maximum transmission count of the first message.

With reference to the third aspect, in some implementations of the third aspect, the first parameter includes the uplink shared channel PUSCH power ramping step, the PUSCH power ramping step is used by the processing unit to increase transmit power of a PUSCH included in the first message, and the first message is the message sent in the first step in the two-step random access procedure. The initiating the random access procedure based on the priority value includes: The processing unit sends the PUSCH by using a sum of a power value of a PUSCH included in a first message sent last time and a priority value of the PUSCH power ramping step as power of the PUSCH.

With reference to the third aspect, in some implementations of the third aspect, the first parameter includes the reference signal received power threshold. The initiating the random access procedure based on the priority value includes: The processing unit initiates the two-step random access procedure after determining that reference signal received power is greater than a priority value of the reference signal received power threshold; or the processing unit initiates the four-step random access procedure after determining that reference signal received power is less than or equal to a priority value of the reference signal received power threshold.

With reference to the third aspect, in some implementations of the third aspect, the random access procedure is used for beam failure recovery or switching.

According to a fourth aspect, a communication apparatus is provided. The apparatus may be configured in a network device or the apparatus is the network device, and includes: a transceiver unit, configured to send first information, where the first information includes a priority value of a first parameter used for a random access procedure. The transceiver unit is further configured to receive a message sent by a terminal device in the random access procedure.

With reference to the fourth aspect, in some implementations of the fourth aspect, the first parameter includes one or more of the following: a maximum transmission count of a first message, an uplink shared channel PUSCH power ramping step, or a reference signal received power threshold.

With reference to the fourth aspect, in some implementations of the fourth aspect, the first parameter includes the maximum transmission count of the first message, the first message is a message sent in a first step in a two-step random access procedure, and the maximum transmission count of the first message is used by the terminal device to choose to initiate the two-step random access procedure or a four-step random access procedure.

With reference to the fourth aspect, in some implementations of the fourth aspect, the first parameter includes the uplink shared channel PUSCH power ramping step, the PUSCH power ramping step is used by the terminal device to increase transmit power of a PUSCH included in the first message, and the first message is the message sent in the first step in the random access procedure.

With reference to the fourth aspect, in some implementations of the fourth aspect, the first parameter includes the reference signal received power threshold, and the reference signal received power threshold is used by the terminal device to choose to initiate the two-step random access procedure or the four-step random access procedure.

With reference to the fourth aspect, in some implementations of the fourth aspect, the random access procedure is used for beam failure recovery or switching.

According to a fifth aspect, a communication method is provided. The method may be performed by a terminal device or a module (for example, a chip) configured in the terminal device. An example in which the method is performed by a terminal device is used for description below.

The method includes: The terminal device determines that a listen before talk LBT failure counter for a first bandwidth reaches a first value, where the LBT failure counter is used to record an LBT failure count. The terminal device initiates a first random access procedure after switching an active bandwidth to a second bandwidth.

According to the solution of this application, after an LBT failure count for a bandwidth reaches a specific value, that is, in a case of channel congestion, access is attempted after the bandwidth is switched to another bandwidth, to ensure normal communication of the terminal device.

With reference to the fifth aspect, in some implementations of the fifth aspect, the method further includes: The terminal device stops a second random access procedure on the first bandwidth.

With reference to the fifth aspect, in some implementations of the fifth aspect, the second bandwidth includes resources of a plurality of types of random access procedures, and the terminal device selects one type of random access procedure to initiate the first random access procedure, where the plurality of types of random access procedures include a two-step random access procedure and a four-step random access procedure.

In an implementation, the terminal device determines, based on a reference signal received power threshold, whether to initiate the two-step random access procedure or the four-step random access procedure on the second bandwidth.

In another implementation, the first random access procedure is initiated by using a resource for a random access procedure whose type is the same as that of the second random access procedure.

In another implementation, the foregoing two implementations may be combined. When there is an ongoing second random access procedure on the first bandwidth, the first random access procedure uses a resource for a random access procedure whose type is the same as that of the second random access procedure. When there is no ongoing random access procedure on the first bandwidth, a resource for selecting a random access procedure used in the first random access procedure is determined based on a reference signal received power threshold.

With reference to the fifth aspect, in some implementations of the fifth aspect, when a resource for only one random access procedure is configured for the second bandwidth, the terminal device initiates the random access procedure based on the configured resource for the random access procedure.

With reference to the fifth aspect, in some implementations of the fifth aspect, the network device configures, for the terminal device, a type of a random access procedure that is initiated after the bandwidth is switched because the LBT failure count reaches a maximum count. When the LBT failure count reaches the maximum count, the terminal device chooses to switch to the second bandwidth based on the type of the random access procedure that is configured by the network device, where the second bandwidth includes a resource for the random access procedure of this type.

With reference to the fifth aspect, in some implementations of the fifth aspect, the method further includes one or more of the following: resetting the LBT failure counter, stopping an LBT failure detection timer, stopping an LBT failure count timer, setting a preamble transmission counter to 1, setting a preamble power ramping counter to 1, setting a preamble power ramping counter in MsgA of the two-step random access procedure to 1, setting a backoff indicator to 0, setting a PUSCH power ramping counter in MsgA of the two-step random access procedure to 1, setting a counter in MsgA of the two-step random access procedure to 1, flushing a Msg3 buffer of the four-step random access procedure, and/or flushing a MsgA buffer of the two-step random access procedure.

According to the solution of this application, after the bandwidth switching, each counter and timer are reset, so that a value recorded in the previous bandwidth does not affect communication on the bandwidth after the switching.

With reference to the fifth aspect, in some implementations of the fifth aspect, the method further includes: maintaining content in the Msg3 buffer of the four-step random access procedure after the second bandwidth is switched to, and/or maintaining content in the MsgA buffer of the two-step random access procedure after the second bandwidth is switched to.

According to the solution of this application, the content in the buffer can be read immediately after the bandwidth switching, thereby avoiding re-assembly.

According to a sixth aspect, a communication apparatus is provided. The apparatus may be configured in a terminal device or the apparatus is the terminal device, and includes: a processing unit, configured to determine that a listen before talk LBT failure counter for a first bandwidth reaches a first value, where the LBT failure counter is used to record an LBT failure count, where the processing unit is further configured to switch an active bandwidth to a second bandwidth; and a transceiver unit, configured to initiate a first random access procedure.

With reference to the sixth aspect, in some implementations of the sixth aspect, the processing unit is further configured to stop a second random access procedure on the first bandwidth.

With reference to the sixth aspect, in some implementations of the sixth aspect, the second bandwidth includes resources of a plurality of types of random access procedures, and the processing unit selects one type of random access procedure to initiate the first random access procedure, where the plurality of types of random access procedures include a two-step random access procedure and a four-step random access procedure.

In an implementation, the processing unit determines, based on a reference signal received power threshold, whether to initiate the two-step random access procedure or the four-step random access procedure on the second bandwidth.

In another implementation, the first random access procedure is initiated by using a resource for a random access procedure whose type is the same as that of the second random access procedure.

In another implementation, the foregoing two implementations may be combined. When there is an ongoing second random access procedure on the first bandwidth, the first random access procedure uses a resource for a random access procedure whose type is the same as that of the second random access procedure. When there is no ongoing random access procedure on the first bandwidth, the processing unit determines a resource for selecting a random access procedure used in the first random access procedure based on a reference signal received power threshold.

With reference to the sixth aspect, in some implementations of the sixth aspect, when a resource for only one random access procedure is configured for the second bandwidth, the processing unit initiates the random access procedure based on the configured resource for the random access procedure.

With reference to the sixth aspect, in some implementations of the sixth aspect, the transceiver unit receives a type that is configured by the network device and that is of a random access procedure initiated after the bandwidth is switched because the LBT failure count reaches a maximum count. When the LBT failure count reaches the maximum count, the processing unit chooses to switch to the second bandwidth based on the type of the random access procedure that is configured by the network device, where the second bandwidth includes a resource for the random access procedure of this type.

With reference to the sixth aspect, in some implementations of the sixth aspect, the processing unit is further configured to perform one or more of the following: resetting the LBT failure counter, stopping an LBT failure detection timer, stopping an LBT failure count timer, setting a preamble transmission counter to 1, setting a preamble power ramping counter to 1, setting a preamble power ramping counter in MsgA of the two-step random access procedure to 1, setting a backoff indicator to 0, setting a PUSCH power ramping counter in MsgA of the two-step random access procedure to 1, setting a counter in MsgA of the two-step random access procedure to 1, flushing a Msg3 buffer of the four-step random access procedure, and/or flushing a MsgA buffer of the two-step random access procedure.

With reference to the sixth aspect, in some implementations of the sixth aspect, the processing unit is further configured to: maintain content in the Msg3 buffer of the four-step random access procedure after the second bandwidth is switched to, and/or maintain content in the MsgA buffer of the two-step random access procedure after the second bandwidth is switched to.

According to a seventh aspect, a communication apparatus is provided, and includes a processor. The processor is coupled to a memory, and may be configured to execute instructions in the memory, to implement the method according to any one of the first aspect or the third aspect and the possible implementations of the first aspect or the third aspect. Optionally, the communication apparatus further includes the memory. Optionally, the communication apparatus further includes a communication interface, and the processor is coupled to the communication interface.

In an implementation, the communication apparatus is a terminal device. When the communication apparatus is the terminal device, the communication interface may be a transceiver or an input/output interface.

In another implementation, the communication apparatus is a chip configured in the terminal device. When the communication apparatus is the chip configured in the terminal device, the communication interface may be an input/output interface.

Optionally, the transceiver may be a transceiver circuit. Optionally, the input/output interface may be an input/output circuit.

According to an eighth aspect, a communication apparatus is provided, and includes a processor. The processor is coupled to a memory, and may be configured to execute instructions in the memory, to implement the method according to any one of the second aspect and the possible implementations of the second aspect. Optionally, the communication apparatus further includes the memory. Optionally, the communication apparatus further includes a communication interface, and the processor is coupled to the communication interface.

In an implementation, the communication apparatus is a network device. When the communication apparatus is the network device, the communication interface may be a transceiver or an input/output interface.

In another implementation, the communication apparatus is a chip configured in the network device. When the communication apparatus is the chip configured in the network device, the communication interface may be an input/output interface.

Optionally, the transceiver may be a transceiver circuit. Optionally, the input/output interface may be an input/output circuit.

According to a ninth aspect, a processor is provided, and includes an input circuit, an output circuit, and a processing circuit. The processing circuit is configured to: receive a signal by using the input circuit, and transmit the signal by using the output circuit, so that the processor performs the method according to any one of the first aspect to the third aspect and the possible implementations of the first aspect to the third aspect.

In a specific implementation process, the processor may be one or more chips, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in embodiments of this application.

According to a tenth aspect, a processing apparatus is provided, and includes a processor and a memory. The processor is configured to read instructions stored in the memory, and may receive a signal by using a receiver, and transmit a signal by using a transmitter, to perform the method according to any one of the first aspect to the third aspect and the possible implementations of the first aspect to the third aspect.

Optionally, there are one or more processors, and there are one or more memories.

Optionally, the memory may be integrated with the processor, or the memory and the processor are disposed separately.

In a specific implementation process, the memory may be a non-transitory memory, for example, a read-only memory (ROM). The memory and the processor may be integrated on a same chip, or may be separately disposed on different chips. A type of the memory and a manner of disposing the memory and the processor are not limited in embodiments of this application.

It should be understood that, a related data exchange process such as sending of indication information may be a process of outputting the indication information from the processor, and receiving of capability information may be a process of receiving input capability information by the processor. Specifically, data output by the processor may be output to the transmitter, and input data received by the processor may be from the receiver. The transmitter and the receiver may be collectively referred to as a transceiver.

The processing apparatus according to the tenth aspect may be one or more chips. The processor in the processing apparatus may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory. The memory may be integrated into the processor, or may be located outside the processor and exist independently.

According to an eleventh aspect, a computer program product is provided. The computer program product includes a computer program (also referred to as code or instructions). When the computer program is run, a computer is enabled to perform the method according to any one of the first aspect to the third aspect and the possible implementations of the first aspect to the third aspect.

According to a twelfth aspect, a computer-readable medium is provided. The computer-readable medium stores a computer program (also referred to as code or instructions). When the computer program is run on a computer, the computer is enabled to perform the method according to any one of the first aspect to the third aspect and the possible implementations of the first aspect to the third aspect.

According to a thirteenth aspect, a communication system is provided. The communication system includes the foregoing network device and terminal device.

DESCRIPTION OF EMBODIMENTS

The following describes technical solutions of this application with reference to the accompanying drawings.

The technical solutions in embodiments of this application may be applied to various communication systems such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future 5th generation (5G) system or a new radio (NR) system, a vehicle-to-everything (Vehicle-to-X, V2X) system, a long term evolution-vehicle (LTE-V) system, an internet of vehicles system, a machine type communication (MTC) system, an internet of things (IoT) system, a long term evolution-machine (LTE-M) system, and a machine to machine (M2M) system, where V2X may include vehicle-to-network (V2N), vehicle-to-vehicle (V2V), vehicle-to-infrastructure (V2I), vehicle-to-pedestrian (V2P), and the like.

Figure 1:
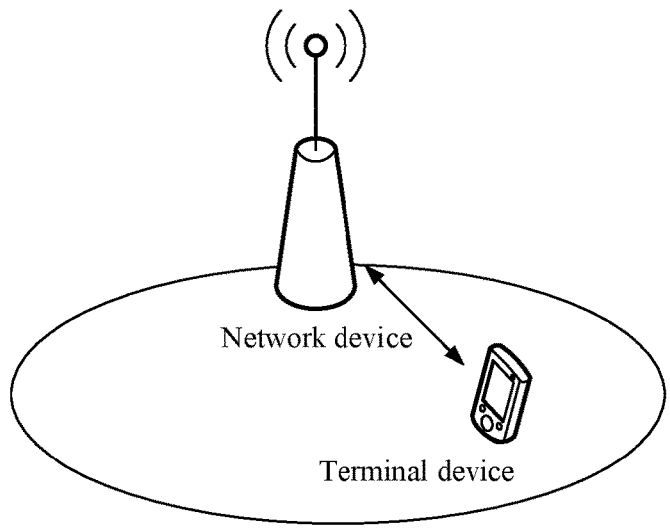
FIG. 1 is a schematic diagram of an example of a communication system applicable to this application.

FIG. 1 is a schematic diagram of a wireless communication system 100 applicable to an embodiment of this application.

As shown in FIG. 1, the wireless communication system 100 may include at least one network device, for example, a network device 110 shown in FIG. 1. The wireless communication system 100 may further include at least one terminal device, for example, a terminal device 120 shown in FIG. 1. The terminal device may access the network device by using a random access procedure.

The terminal device in embodiments of this application may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone, a tablet computer (pad), a computer having a wireless transceiver function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a 5G network, a terminal device in a future evolved public land mobile network (PLMN), or the like.

The wearable device may also be referred to as a wearable intelligent device, and is a general term for wearable devices such as glasses, gloves, watches, clothes, and shoes that are developed by applying wearable technologies to intelligent designs of daily wear. The wearable device is a portable device that can be directly worn by a user or integrated into clothes or an accessory of the user. The wearable device is not only a hardware device, but also implements a powerful function through software support, data exchange, and cloud interaction. In a broad sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, the terminal device may alternatively be a terminal device in an internet of things (IoT) system. The IoT is an important part in development of future information technologies. A main technical feature of the IoT is to connect an object to a network by using a communication technology, to implement an intelligent network for human-machine interconnection and thing-thing interconnection.

It should be understood that a specific form of the terminal device is not limited in this application.

The network device in embodiments of this application may be any device having a wireless transceiver function. The device includes but is not limited to an evolved NodeB (eNB), a radio network controller (RNC), a NodeB (NB), a base station controller (BSC), a base transceiver station (BTS), a home base station (for example, a Home evolved NodeB, or a Home NodeB, HNB), a baseband unit (BBU), an access point (AP) in a wireless fidelity (Wi-Fi) system, a wireless relay node, a wireless backhaul node, a transmission point (TP), a transmission reception point (TRP), or the like. Alternatively, the network device may be a gNB or a transmission point (TRP or TP) in a 5G system (for example, an NR system), one antenna panel or a group of antenna panels (including a plurality of antenna panels) of a base station in a 5G system, or a network node, for example, a baseband unit (BBU) or a distributed unit (DU), that constitutes a gNB or a transmission point.

In some deployments, the gNB may include a centralized unit (CU) and the DU. The gNB may further include an active antenna unit (AAU for short). The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (radio access network, RAN), or the CU may be classified into a network device in a core network (CN). This is not limited in this application.

The network device provides a cell with a service, and a terminal device communicates with the cell by using a transmission resource (for example, a frequency domain resource or a spectrum resource) allocated by the network device. The cell may belong to a macro base station (for example, a macro eNB or a macro gNB), or may belong to a base station corresponding to a small cell. The small cell herein may include a metro cell, a micro cell, a pico cell, a femto cell, and the like. These small cells have characteristics of small coverage and low transmit power, and are applicable to providing a high-rate data transmission service.

In addition, to facilitate understanding of embodiments of this application, the following several descriptions are provided.

First, in this application, "used to indicate" may include "used to directly indicate" and "used to indirectly indicate". When indication information is described as being used to indicate A, the indication information may be used to directly indicate A or used to indirectly indicate A, but it does not necessarily mean that the indication information includes A.

Second, in the following embodiments, "first", "second", and various numeric numbers and letter numbers are merely used for distinguishing for ease of description, and are not used to limit the scope of embodiments of this application. For example, the terms are used to distinguish between different preset correspondences.

Third, in the following embodiments, "preset" may include "indicated by a network device by using signaling" or "predefined", for example, "defined in a protocol". Herein, "predefined" may be implemented in a manner in which corresponding code, a table, or other related indication information is pre-stored in a device (for example, including user equipment and a network device). A specific implementation thereof is not limited in this application.

Fourth, a "protocol" in embodiments of this application may be a standard protocol in the communication field, for example, may include an LTE protocol, an NR protocol, and a related protocol applied to a future communication system. This is not limited in this application.

For ease of understanding of embodiments of this application, concepts in embodiments of this application are first described below.

1. Four-Step Random Access Procedure

In an LTE system and a 5G NR system, a random access procedure usually needs to be performed in the following several cases: The terminal device switches from an idle mode to a connected mode when initially accessing the LTE system and the 5G NR system; a radio resource control (RRC) connection is re-established after a radio connection is interrupted; the terminal device needs to establish uplink synchronization with a target cell during switching; when the terminal device is in a connected mode but uplink synchronization is not performed on the terminal device, uplink data or downlink data arrives, and the uplink synchronization needs to be established through random access; user positioning is performed based on uplink measurement; and when no dedicated scheduling request resource is allocated on a physical uplink control channel (PUCCH), an uplink resource is applied for through random access.

As the 5G NR system is further discussed, a new scenario may be introduced into random access. For example, downlink data (DL data) arrives in an inactive mode, and an uplink is in an out-of-synchronization state in this case; uplink data (UL data) arrives in the inactive mode, and the uplink is in the out-of-synchronization state in this case; inactive mode is changed; the terminal device requests on-demand system information (SI); the terminal device sends a beam failure recovery request; and the terminal device requests system information (request for other SI).

Contention-based random access of the LTE system and the 5G NR system includes the following procedures.

a. Random Access Initialization.

The random access procedure is triggered by using a physical downlink control channel (PDCCH) order or by a MAC sublayer or an RRC sublayer. If the terminal device receives a PDCCH transmission that is scrambled by a cell radio network temporary identifier (C-RNTI) and consistent with the PDCCH order, the random access procedure is triggered. The PDCCH order or an RRC message can indicate preamble indexes RA-Preamble Index (64 preamble indexes in total) and physical random access channel indexes RA-PRACH-Mask Index (16 PRACH mask indexes in total) that are used during resource selection in the random access procedure.

The preamble index is used to indicate a preamble for random access. When a value of the preamble index is 000000, it indicates that the random access is initiated by the MAC sublayer, that is, the preamble is selected by the MAC sublayer, and correspondingly, contention random access is performed. When the value of the preamble index is not 000000, UE performs random access by using a preamble indicated by the preamble index, that is, performs non-contention-based random access. The physical layer access channel index RA-PRACH-Mask Index is used to indicate a specific subframe in a system frame, where the terminal device may send a preamble on a PRACH corresponding to the subframe. The terminal device may search a correspondence table by using the RA-PRACH-Mask Index, to determine the preamble and an available physical resource.

Parameters need to be configured for random access initialization. The parameters include: a PRACH resource set (for example, PRACH-Config Index) that may be used to transmit a random access preamble; an available group of random access preambles (a group A or a group B) and an available preamble set in each group; a maximum preamble transmission count (preamble Trans-Max); preamble initial transmit power (preamble Initial Received Target power); a power ramping step; a random access response window (RA-Response window Size); a maximum HARQ retransmission count of a third message (Msg3) (max HARQ-Msg3); and a contention resolution timer (mac-Contention Resolution Timer).

It should be noted that, before each random access procedure is triggered, all of the configured parameters can be updated through higher layer configuration. After obtaining the foregoing parameters, the terminal device performs the following operations: flushing a Msg3 buffer; setting a preamble transmission count (PREAMBLE_TRANSMISSION_COUNTER) to 1; setting a preamble power ramping count (PREAMBLE_POWER_RAMPING_COUNTER) to 1; and setting a backoff parameter value saved by the terminal device to 0 ms, and entering a random access resource selection phase.

b. The Terminal Device Sends a Random Access Preamble (RAP) to the Network Device.

Specifically, the RAP is carried in a first message (Msg1). A main function of the RAP is to notify the network device that there is a random access request, and enable the network device to estimate a transmission delay between the network device and the terminal device, so that an access network device can calibrate an uplink advance (uplink timing) and notify the terminal device of calibration information by using a timing advance command.

As a new random access scenario is introduced into the 5G NR system, the random access may also be used for another request of the terminal device in the new scenario. For example, the RAP may alternatively be used to indicate to send an on-demand system information request, or be used to indicate to send a beam failure recovery request. This is not limited in this application.

For example, there may be a correspondence between the RAP and one or more on-demand SI requests, or there may be a correspondence between the RAP and one or more beam failure recovery requests. The terminal device may preconfigure the RAP, or receive the RAP configured by the access network device.

If an access procedure fails, the UE increases power by powerRampingStep from previous transmit power to send a next preamble, to increase a transmission success rate. Each time preamble power ramps, PREAMBLE_POWER_RAMPING_COUNTER is increased by 1.

c. The Terminal Receives a Random Access Response (RAR) Sent by the Network Device.

Specifically, the terminal device may monitor a PDCCH by using a random access radio network temporary identifier (RA-RNTI). If receiving scheduling information, namely, downlink control information (DCI), that belongs to the terminal device, the terminal device receives, on a PDSCH based on the DCI, a RAR message delivered by the network device. The DCI includes related content such as resource block (RB) allocation information and a modulation and coding scheme (MCS).

Specifically, the random access response is carried in a second message (Msg2). After sending the preamble, the terminal device monitors a corresponding PDCCH within the RAR response window based on an RA-RNTI value corresponding to the preamble. If a preamble carried in the response received by the terminal device is consistent with the preamble sent in Msg1, the terminal device stops monitoring the RAR. Specifically, the network device may send the RAR to the terminal device by using the PDSCH.

The RAR includes an uplink timing advance, an uplink grant (UL grant) allocated to the third message (Msg3), a C-RNTI allocated by a network side, and the like. The PDCCH carrying a Msg2 scheduling message is scrambled by using the RA-RNTI.

d. The Terminal Device Sends a Message (Namely, Msg3) that is Based on Scheduled Transmission to the Network Device.

The terminal device sends Msg3 to the network device by using a physical uplink shared channel (PUSCH) based on the uplink grant and uplink timing advance information in Msg2. Herein, content of Msg3 may alternatively be different based on different statuses of the terminal device and different application scenarios.

Because the network device sends a MAC PDU to a plurality of terminal devices, all the terminal devices may receive different RARs. Correspondingly, behavior of all the terminal devices may also be different. After obtaining, through monitoring, a RAR that belongs to each terminal device, the terminal device may send Msg3 to the access network device based on specific content included in the RAR. A Msg3 buffer is used to store Msg3.

Msg3 may be classified into the following types: an RRC connection request, a tracking area data update, a resource scheduling request, and the like. Some examples of Msg3 are provided in Table 1.

TABLE 1

| Random access reason | Message type | Terminal device identifier |
|---|---|---|
| Initial network access | RRC connection request | NAS terminal device ID (S-TMSI) or random number |
| RRC connection reestablishment | RRC connection reestablishment request | C-RNTI |
| Switching | Switching message | C-RNTI |
| Downlink data arrival | C-RNTI MAC control element | C-RNTI |
| Uplink data arrival | C-RNTI MAC control element | C-RNTI | e. The Terminal Device Receives Contention Resolution, Namely, a Fourth Message Msg4, Sent by the Network Device.

Contention occurs when the plurality of terminal devices use a same preamble to initiate random access. A maximum of one terminal device in terminal devices contending for a same resource can succeed in accessing. In this case, the network device sends a contention resolution message to the terminal device by using a physical downlink shared channel (PDSCH).

Specifically, after sending Msg3, the terminal device starts the contention resolution timer (mac-Contention Resolution Timer), and monitors the PDCCH by using the temporary C-RNTI indicated in the RAR or a C-RNTI preconfigured by the network device. If the terminal device receives, before the contention resolution timer expires, the contention resolution message sent by the network device to the terminal device, it is considered that the random access procedure succeeds.

2. Two-Step Random Access Procedure

A process of two-step random access is as follows:

a. The Terminal Device Sends MsgA to the Network Device.

Specifically, MsgA includes a random access signal and payload data (PUSCH). The random access signal may include a preamble and/or a demodulation reference signal (DMRS). The random access signal is used to receive the payload data. For example, a transmission boundary (for example, a start location and an end location of a slot for transmitting the payload data) or demodulation of the payload data may be determined based on the random access signal. The payload data may be control plane data and/or user plane data. The payload data may correspond to the content included in Msg3 in the foregoing four-step random access mechanism. For example, the payload data may include any one of an RRC connection request, an identifier of the terminal device, a scheduling request, a buffer status report (BSR), real service data, and the like. A MsgA buffer is redefined in a two-step RACH, is similar to the Msg3 buffer in the four-step random access procedure, and is used to store the payload data of MsgA.

Optionally, the identifier of the terminal device may be a C-RNTI, a serving-temporary mobile subscriber identity (s-TMSI), an identifier (resumeIdentity) of the terminal in an inactive mode, or the like. A specific identifier carried depends on different random access trigger events, and is not limited. It should be noted that the identifier of the terminal device may be all carried in the payload data, or may be partially carried in the payload data, and partially carried in the random access signal. Being carried in the random access signal may be understood as that different sequences or same sequences with different cyclic shifts represent different bit values.

After receiving MsgA, the network device decodes the random access signal and the payload data, to obtain decoding states including: (1) "successfully decoded" and (2) "unsuccessfully decoded".

Further, possible relationships between a resource on which the random access signal is located and a resource on which the payload data is located are as follows: (1) There is an overlapping area in time domain, and there is no overlapping area in frequency domain; (2) there is no overlapping area in time domain, and there may be or may not be an overlapping area in frequency domain. The resource on which the random access signal is located and the resource on which the payload data is located may be configured by the network device.

b. The Network Device Sends MsgB to the Terminal Device.

Specifically, MsgB is used to carry a response message for the random access signal and the payload data. The response message may include at least one of the following: information about the temporary C-RNTI, information about a timing advance command (TA command), information about an uplink grant, information about a contention resolution identity (contention resolution ID), and the like. The contention resolution identity may be a part or all of content of the payload data.

In addition, the response message further includes a control plane message (which may also be considered as an acknowledgement that is based on scheduled transmission). For example, based on different statuses of the terminal device and different triggering scenarios, an RAR may further include one of the following: an RRC setup (RRCSetup) message, an RRC reestablishment (RRCReestablishment) message, an RRC resume (RRCResume) message, and the like.

The response message in this application is a response message for requesting random access, and may also be referred to as a random access response (message).

3. Bandwidth Part (BWP)

As communication technologies develop, a used spectrum is increasingly wide. NR has a large spectrum bandwidth. To use the spectrum more flexibly, a BWP technology, namely, a bandwidth part technology, is used in NR. The base station may activate different BWPs for the UE based on load of the base station and a service requirement of the UE. For example, when the UE performs a large quantity of data services, the base station activates a wide BWP for the UE. When finding that a BWP currently activated by the UE has heavy load, the base station activates another idle BWP for the UE.

The base station configures initial uplink and downlink BWPs for a cell. After the UE accesses the cell, the base station configures a maximum of four dedicated BWPs for the UE and activates one of the BWPs as required. Only one BWP can be activated for one UE in one cell at a time.

4. Listen Before Talk (LBT)

A basis of wireless communication is a spectrum resource, and the spectrum resource may be classified into two types: a licensed spectrum and an unlicensed spectrum. The licensed spectrum can be used only by a specific operator in a place, and the unlicensed spectrum can be used by any operator and is a shared spectrum resource. Embodiments of the present invention is mainly for the unlicensed spectrum.

In the unlicensed spectrum, because the unlicensed spectrum is a shared spectrum, there are a plurality of different air interface technologies, such as Wi-Fi, LTE licensed assisted access (LAA), and LTE Multefire. To ensure that different air interface technologies coexist on the unlicensed spectrum, a mechanism is required to avoid mutual interference. This mechanism is the LBT.

The LBT refers to a channel access procedure that needs to be performed before a device performs data transmission. If the channel access procedure succeeds, data transmission can be performed. If the channel access procedure fails, data transmission cannot be performed.

The channel access procedure includes two types. A first type is energy detection that is based on fixed duration. The device detects strength of a signal on an unlicensed spectrum resource. If the strength is greater than a preset threshold, it is considered that a channel is busy; or if the strength is not greater than a preset threshold, it is considered that the channel is idle. A second type is energy detection based on a backoff mechanism. The device randomly selects a value A from a window [minimum value, maximum value]. A channel is considered idle only after at least A idle slots for energy detection are detected; otherwise, the channel is considered busy. The device can perform data transmission only when the channel is considered idle.

The following describes embodiments of this application in detail with reference to the accompanying drawings.

Figure 2:
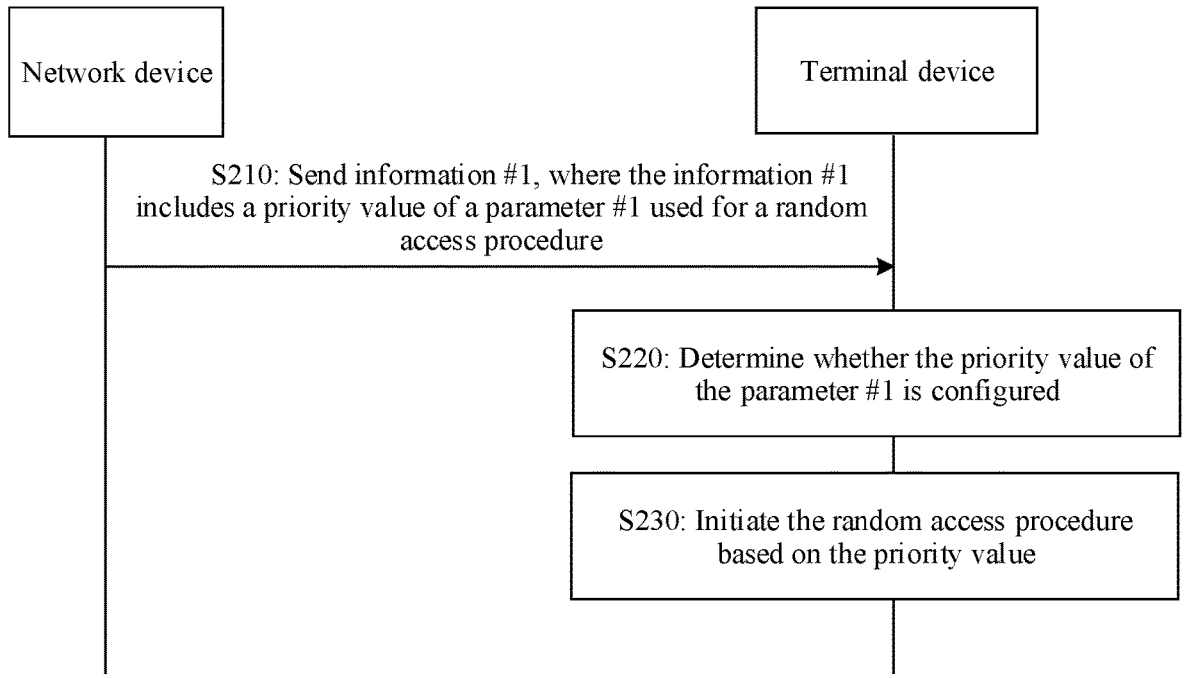
FIG. 2 is a flowchart of an example of a random access method according to an embodiment of this application.

FIG. 2 is a flowchart of an example of a random access method according to an embodiment of this application.

S210: A network device sends information #1 (namely, an example of first information) to a terminal device, where the information #1 includes a priority value of a parameter #1 (namely, an example of a first parameter) used for a random access procedure.

S220: The terminal device determines whether the priority value of the parameter #1 is configured.

The network device configures the priority value of the parameter #1 in the random access procedure for the terminal device by using the information #1. Before initiating the random access procedure, the terminal device determines whether the network device configures the priority value of the parameter #1 for the terminal device. When the network device configures the priority value of the parameter #1 for the terminal device, the terminal device initiates the random access procedure based on the priority value of the parameter #1. When the priority value of the parameter #1 is not configured, the terminal device initiates the random access procedure based on a first value of the parameter #1. The network device configures the first value of the parameter #1 for the terminal device by using information #2. That is, the network device separately configures the priority value of the parameter #1 and the first value of the parameter #1 for the terminal device by using two different pieces of configuration information.

According to the solution of this application, the network device configures the priority value of the parameter of the random access procedure for the terminal device, so that the terminal device can initiate the random access procedure based on the priority value of the parameter, to quickly access a network.

By way of example but not limitation, the priority value of the parameter #1 is used for a random access procedure initiated due to beam failure recovery or switching.

The beam failure recovery includes but is limited to a process in which the terminal device recovers a serving beam connection to the network device. For example, when the terminal device detects that quality of a serving beam is poor (that is, receive power of a beam failure detection reference signal is less than a threshold), the terminal device initiates the random access procedure to recover the connection between the terminal device and the network device. The switching may include, but is not limited to, switching of a serving cell. For example, when the serving cell of the terminal device is switched, the terminal device needs to initiate the random access procedure to access a target serving cell.

When detecting that a serving beam reference signal is less than the threshold, the terminal device determines that the beam failure recovery and/or switching are/is preferred random access procedures/random access procedure.

When initiating the random access procedure used for the beam failure recovery and/or switching, the terminal device needs to determine whether the network device configures the priority value of the parameter #1 for the terminal device. If the priority value is configured, the terminal device initiates the random access procedure based on the priority value of the parameter #1.

For example, when detecting a beam failure, the terminal device needs to initiate the random access procedure used for beam failure recovery. In this case, the terminal device first determines whether the network device configures the priority value of the parameter #1 for the terminal device. When the priority value of the parameter #1 is configured, the terminal device initiates the random access procedure based on the priority value of the parameter #1. When the priority value of the parameter #1 is not configured, the terminal device initiates the random access procedure based on the first value of the parameter #1.

For another example, when the terminal device needs to initiate the random access procedure because the terminal device determines to switch to another cell, the terminal device first determines whether the network device configures the priority value of the parameter #1 for the terminal device. When the priority value of the parameter #1 is configured, the terminal device initiates the random access procedure based on the priority value of the parameter #1. When the priority value of the parameter #1 is not configured, the terminal device initiates the random access procedure based on the first value of the parameter #1.

In this application, the parameter #1 includes but is not limited to one or more of the following parameters: a parameter a, a parameter b, and a parameter c.

The parameter a is a maximum transmission count of MsgA.

MsgA is a message sent in a first step in the two-step random access procedure. The maximum transmission count of MsgA is used by the terminal device to determine, after comparing a transmission count of MsgA with a value of the parameter a (namely, the maximum transmission count of MsgA), whether to initiate the two-step random access procedure or initiate the four-step random access procedure. When the transmission count of MsgA is less than or equal to the value of the parameter a, the terminal device initiates the two-step random access procedure. When the transmission count of MsgA is greater than the value of the parameter a, the terminal device initiates the four-step random access procedure. When the transmission count of MsgA is equal to the value of the parameter a, the terminal device may alternatively initiate the four-step random access procedure.

When needing to initiate the random access procedure, the terminal device first determines whether a priority value of the maximum transmission count of MsgA is configured. When the priority value of the maximum transmission count of MsgA is configured, the terminal device compares the transmission count of MsgA with the priority value of the maximum transmission count of MsgA, and the terminal device initiates the two-step random access procedure when the transmission count of MsgA is less than or equal to the priority value of the maximum transmission count of MsgA, or the terminal device initiates the four-step random access procedure when the transmission count of MsgA is greater than the priority value of the maximum transmission count of MsgA. When the priority value of the maximum transmission count of MsgA is not configured, the terminal device compares the transmission count of MsgA with a first value of the maximum transmission count of MsgA, and the terminal device initiates the two-step random access procedure when the transmission count of MsgA is less than or equal to the first value of the maximum transmission count of MsgA, or the terminal device initiates the four-step random access procedure when the transmission count of MsgA is greater than the first value of the maximum transmission count of MsgA.

For example, the information #1 may include but is not limited to the following format:

```
RA-Prioritization::=          SEQUENCE {
    MsgA-TransMaxHighPriority      ENUMERATED {A, B, C, D},
    ...
}
``` where RA-Prioritization represents the information #1, and MsgA-TransMaxHighPriority is used to configure the priority value of the maximum transmission count of MsgA, where the priority value may be one selected from {A, B, C, D}.

For another example, the information #2 may include but is not limited to the following format:

```
RACH-ConfigGenericTwoStepRA:: =          SEQUENCE {
    MsgA-TransMax              ENUMERATED {E, F, G, H},
    ...
}
``` where RACH-ConfigGenericTwoStepRA represents the information #2, and MsgA-TransMax is used to configure the first value of the maximum transmission count of MsgA, where the first value may be one selected from {E, F, G, H}.

In this application, an optional value of the priority value of the parameter #1 may be the same as or different from an optional value of the first value of the parameter #1. This is not limited in this application. For example, the optional values {A, B, C, D} of the priority value and the optional values {E, F, G, H} of the first value may include same values, or may include at least one different value.

In an implementation, the priority value of the maximum transmission count of MsgA configured by the network device for the terminal device is greater than the first value of the maximum transmission count of MsgA. This application is not limited thereto.

The parameter b is a PUSCH power ramping step.

The PUSCH power ramping step is used by the terminal device to determine transmit power of a PUSCH included in a first-step message in the two-step random access procedure. The terminal device calculates a sum of transmit power of a PUSCH included in a first-step message sent last time and a value of the PUSCH power ramping step, and sends the PUSCH by using the sum as transmit power.

When determining that two-step random access needs to be initiated, the terminal device determines whether the network device configures a priority value of the PUSCH power ramping step for the terminal device. When the priority value of the PUSCH power ramping step is configured, the terminal device calculates the transmit power of the PUSCH based on the priority value of the PUSCH power ramping step. When the priority value of the PUSCH power ramping step is not configured, the terminal device calculates the transmit power of the PUSCH based on a first value of the PUSCH power ramping step.

For example, the information #1 may include but is not limited to the following format:

```
RA-Prioritization::=          SEQUENCE {
    MsgA-PUSCH-powerRampingStepHighPriority    ENUMERATED {A, B, C, D},
    ...
}
``` where RA-Prioritization represents the information #1, and MsgA-PUSCH-powerRampingStepHighPriority is used to configure the priority value of the PUSCH power ramping step, where the priority value may be one selected from {A, B, C, D}.

For another example, the information #2 may include but is not limited to the following format:

```
RACH-ConfigGenericTwoStepRA:: =          SEQUENCE {
    MsgA-PUSCH-powerRampingStep    ENUMERATED {E, F, G, H},
    ...
}
``` where RACH-ConfigGenericTwoStepRA represents the information #2, and MsgA-PUSCH-powerRampingStep is used to configure the first value of the PUSCH power ramping step, where the first value may be one selected from {E, F, G, H}.

In this application, an optional value of the priority value of the PUSCH power ramping step may be the same as or different from an optional value of the first value of the PUSCH power ramping step. This is not limited in this application. For example, the optional values {A, B, C, D} of the priority value and the optional values {E, F, G, H} of the first value may include same values, or may include at least one different value.

In an implementation, the priority value of the PUSCH power ramping step configured by the network device for the terminal device is greater than the first value of the PUSCH power ramping step. This application is not limited thereto.

The parameter c is a reference signal received power threshold.

The reference signal received power threshold is used by the terminal device to compare reference signal received power with a configured reference signal received power threshold, to determine whether to use the two-step random access procedure or the four-step random access procedure. When the reference signal received power is greater than the configured reference signal received power threshold, the terminal device initiates the two-step random access procedure. When the reference signal received power is less than or equal to the configured reference signal received power threshold, the terminal device initiates the four-step random access procedure. When the reference signal received power is equal to the configured reference signal received power threshold, the terminal device may alternatively initiate the two-step random access procedure. By way of example but not limitation, the reference signal may be a downlink path loss reference signal.

When needing to initiate the random access procedure, the terminal device first determines whether a priority value of the reference signal received power threshold is configured. When the priority value of the reference signal received power threshold is configured, the terminal device compares the reference signal received power with the priority value of the reference signal received power threshold, and the terminal device initiates the two-step random access procedure when the reference signal received power is greater than the priority value of the reference signal received power threshold, or the terminal device initiates the four-step random access procedure when the reference signal received power is less than or equal to the priority value of the reference signal received power threshold. When the priority value of the reference signal received power threshold is not configured, the terminal device compares the reference signal received power with a first value of the reference signal received power threshold, and the terminal device initiates the two-step random access procedure when the reference signal received power is greater than the first value of the reference signal received power threshold, or the terminal device initiates the four-step random access procedure when the reference signal received power is less than or equal to the first value of the reference signal received power threshold.

For example, the information #1 may include but is not limited to the following format:

```
RA-Prioritization::=            SEQUENCE {
    rsrp-ThresholdSSB-TwoStepHighPriority        ENUMERATED
                                    {A, B, C, D},
    ...
}
``` where RA-Prioritization represents the information #1, and rsrp-ThresholdSSB-TwoStepHighPriority is used to configure the priority value of the reference signal received power threshold, where the priority value may be one selected from {A, B, C, D}.

For another example, the information #2 may include but is not limited to the following format:

```
RACH-ConfigCommonTwoStepRA::=         SEQUENCE {
    rsrp-ThresholdSSB-TwoStep     ENUMERATED {E, F, G, H},
    ...
}
``` where RACH-ConfigCommonTwoStepRA represents the information #2, and rsrp-ThresholdSSB-TwoStep is used to configure the first value of the reference signal received power threshold, where the first value may be one selected from {E, F, G, H}.

In this application, an optional value of the priority value of the reference signal received power threshold may be the same as or different from an optional value of the first value of the reference signal received power threshold. This is not limited in this application. For example, the optional values {A, B, C, D} of the priority value and the optional values {E, F, G, H} of the first value may include same values, or may include at least one different value.

In an implementation, the priority value of the reference signal received power threshold configured by the network device for the terminal device is less than the first value of the reference signal received power threshold. This application is not limited thereto.

In this application, the parameter #1 may include but is not limited to one or more of the foregoing parameter a, parameter b, or parameter c.

For example, the parameter #1 includes the parameter a and the parameter b, that is, includes the PUSCH power ramping step and the maximum transmission count of MsgA. In this case, the information #1 may include but is not limited to the following format:

```
RA-Prioritization::=            SEQUENCE {
    MsgA-PUSCH-powerRampingStepHighPriority    ENUMERATED
{A, B, C, D},
    MsgA-TransMaxHighPriority           ENUMERATED {E, F,
                                    G, H},
    ...
}
```

For another example, the parameter #1 includes the foregoing three parameters, that is, includes the maximum transmission count of MsgA, the PUSCH power ramping step, and the reference signal received power threshold.

```
RA-Prioritization::=        SEQUENCE {
    MsgA-PUSCH-powerRampingStepHighPriority    ENUMERATED
{A, B, C, D},
    MsgA-TransMaxHighPriority      ENUMERATED {E, F, G, H},
    rsrp-ThresholdSSB-TwoStepHighPriority    ENUMERATED {R, J,
                                    K, L},
    ...
}
```

In addition, the information #1 may be a dedicated configuration for the two-step random access procedure. That is, the information #1 is used to configure a parameter with a priority value for the two-step random access procedure.

The information #1 may alternatively be a common parameter of the two-step random access procedure and the four-step random access procedure. That is, a parameter with a priority value in the random access procedure (regardless of the two-step random access procedure or the four-step random access procedure) is included in the information #1.

For example, the information #1 includes priority value configurations of the PUSCH power ramping step, a preamble power ramping step, and a backoff indication. The preamble power ramping step may be used to calculate transmit power of a preamble (namely, a random access preamble) sent in the four-step random access procedure, and may also be used to calculate transmit power of a preamble (which may include the random access preamble and/or a DMRS) sent in the two-step random access procedure. The backoff indication is used by the terminal device to calculate time for which the terminal device needs to wait before retransmitting the preamble. The backoff indication may be used in both the four-step random access procedure and the two-step random access procedure.

```
RA-Prioritization ::=         SEQUENCE {
    powerRampingStepHighPriority       ENUMERATED {dB0, dB2, dB4, dB6},
    scalingFactorBI                    ENUMERATED {zero, dot25, dot5, dot75}
    MsgA-PUSCH-powerRampingStepHighPriority    ENUMERATED
{A, B, C, D},
    ...
 }
```

By way of example but not limitation, the information #1 is carried in a system information block (SIB) or an RRC message.

It should be noted that representation names of the information #1, the information #2, and the parameter #1 are merely examples in this solution. This application is not limited thereto.

Figure 3:
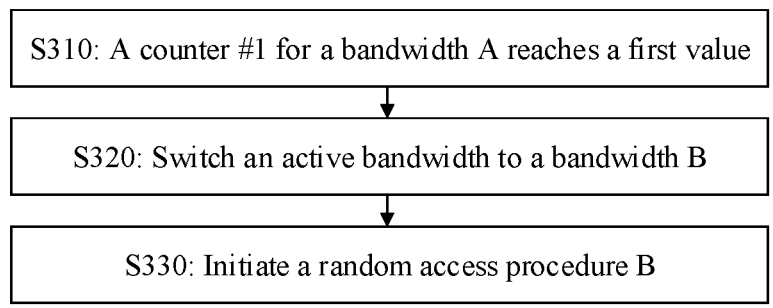
FIG. 3 is a flowchart of another example of a random access method according to an embodiment of this application.

FIG. 3 is a flowchart of another example of a random access method according to an embodiment of this application.

S310: A counter #1 for a bandwidth A (namely, an example of a first bandwidth) reaches a first value.

S320: Switch an active bandwidth to a bandwidth B (namely, an example of a second bandwidth).

S330: Initiate a random access procedure B (namely, an example of a first random access procedure).

In an unlicensed spectrum access technology based on an NR technology, when a terminal device operates on a bandwidth A and the counter #1 reaches the first value, the terminal device switches the active bandwidth to the bandwidth B. The counter #1 is used to record an LBT failure count detected by the terminal device. The bandwidth may be a BWP. The active bandwidth may be an active BWP, and may also be referred to as an operating bandwidth, namely, a bandwidth used for communication. This application is not limited thereto.

By way of example but not limitation, the first value is a maximum value of an LBT failure count that is specified in a protocol or preset in a system, or the first value is a maximum value of an LBT failure count that is configured by a network device for the terminal device.

After the active bandwidth of the terminal device is switched from the bandwidth A to the bandwidth B, the terminal device needs to perform random access initialization when initiating random access. This includes but is not limited to one or more of the following cases.

Case 1

If there is an ongoing random access procedure A (namely, an example of a second random access procedure) on the bandwidth A of the terminal device, the random access procedure A is stopped. After the active bandwidth is switched to the bandwidth B, the terminal device initiates the random access procedure B.

When both a resource of a two-step random access procedure and a resource of a four-step random access procedure are configured for the bandwidth B, the terminal device selects a random access procedure type to initiate the random access procedure B.

In an implementation, the terminal device determines, based on a reference signal received power threshold, whether to initiate the two-step random access procedure or the four-step random access procedure on the bandwidth B. When the terminal device determines that reference signal received power is greater than the threshold, the terminal device initiates the two-step random access procedure (where the random access procedure B is the two-step random access procedure); or when the terminal device determines that reference signal received power is less than or equal to the threshold, the terminal device initiates the four-step random access procedure (where the random access procedure B is the four-step random access procedure). By way of example but not limitation, the reference signal may be a downlink path loss reference signal.

In another implementation, the terminal device initiates the random access procedure B by using a type of the ongoing random access procedure A on the bandwidth A. For example, if the random access procedure A is the two-step random access procedure, the terminal device initiates the two-step random access procedure on the bandwidth B (that is, the random access procedure B is the two-step random access procedure). For another example, the random access procedure A is the four-step random access procedure. In this case, the terminal device initiates the four-step random access procedure on the bandwidth B (that is, the random access procedure B is the four-step random access procedure).

In another implementation, the foregoing two implementations may be combined. When there is the ongoing random access procedure A on the bandwidth A, the type of the random access procedure B is the same as that of the random access procedure A. When there is no ongoing random access procedure A on the bandwidth A, the type of the random access procedure B is determined based on the reference signal received power threshold.

When a resource of only one random access procedure is configured for the bandwidth B, the terminal device initiates random access based on the configured resource of the random access procedure. For example, when a resource of only the two-step random access procedure is configured for the bandwidth B, the terminal device initiates the two-step random access procedure on the bandwidth B (that is, the random access procedure B is the two-step random access procedure). For another example, when a resource of only the four-step random access procedure is configured for the bandwidth B, the terminal device initiates the four-step random access procedure on the bandwidth B (that is, the random access procedure B is the four-step random access procedure).

When an LBT failure count reaches a maximum count, the terminal device chooses, based on a type that is configured by the network device and that is of a random access procedure to be initiated after bandwidth switching is performed because the LBT failure count reaches the maximum count, to switch to a bandwidth including a resource of a random access procedure of this type, to initiate the random access procedure of this type.

In an implementation, the network device configures, for the terminal device, a type of a random access procedure to be initiated after bandwidth switching is performed because the LBT failure count reaches the maximum count. That is, the network device configures a type of the random access procedure B for the terminal device, for example, a two-step random access procedure. After the LBT failure count reaches the maximum count, the terminal device switches to a bandwidth including a resource of the two-step random access procedure. That is, the terminal device determines that the bandwidth B includes the resource of the two-step random access procedure. In this case, the terminal device switches to the bandwidth B, and initiates the two-step random access procedure on the bandwidth B.

Case 2

The terminal device resets the counter #1, for example, resets the counter #1 to 0. This application is not limited thereto. This can avoid frequent bandwidth switching caused because the counter that records the LBT failure count keeps the first value. A name of the counter #1 may be represented as LBT_FAIL_COUNTER. This application is not limited thereto.

Case 3

If a timer #1 is running, the terminal device stops the timer #1, where the timer #1 is configured to maintain the counter #1. If no LBT detection failure occurs during running of the timer #1 (that is, a recorded value of the counter #1 is not increased), the counter #1 is reset.

Each time LBT detection of the terminal device fails, the timer #1 is started or restarted once. In other words, when the counter #1 is increased by 1, the timer #1 is started or restarted.

During running of the timer #1, to be specific, in a period from time when the timer #1 is started to time when the timer #1 expires, if no LBT failure is detected, to be specific, the counter #1 is not increased and remains a same value, the counter #1 is reset. A name of the timer may be an LBT failure detection timer (lbtFailureDetectionTimer). This application is not limited thereto. Case 4

If a timer #2 is running, the terminal device stops the timer #2. The timer #2 is used to prevent frequent bandwidth switching caused because the counter #1 is rapidly increased to the first value within a short period of time. During running of the timer #2, regardless of an LBT failure count detected by the terminal device, the counter #1 is only increased by 1. A name of the timer #2 may be an LBT failure count timer (lbtFailureCountTimer). This application is not limited thereto.

Case 5

The terminal device flushes a Msg3 buffer of a four-step random access procedure. If needing to initiate the four-step random access procedure on the bandwidth B, the terminal device needs to re-assemble Msg3.

Case 6

The terminal device flushes a MsgA buffer of a two-step random access procedure. If needing to initiate the two-step random access procedure on the bandwidth B, the terminal device needs to re-assemble MsgA.

Case 7

After switching to the bandwidth B, the terminal device keeps a Msg3 buffer of a four-step random access procedure. If needing to initiate the four-step random access procedure on the bandwidth B, the terminal device obtains a packet from the Msg3 buffer and sends the packet without reassembling the packet.

Case 8

After switching to the bandwidth B, the terminal device keeps a MsgA buffer of a two-step random access procedure. If needing to initiate the two-step random access procedure on the bandwidth B, the terminal device obtains a packet from the MsgA buffer and sends the packet without reassembling the packet.

Case 9

The terminal device sets a preamble transmission counter (PREAMBLE_TRANSMISSION_COUNTER) to 1, so that a recorded value in a previous bandwidth does not affect normal communication on a bandwidth after switching. The preamble counter is used to record a preamble transmission count, and may be a preamble counter of a four-step random access procedure, or may be a preamble counter shared by a two-step random access procedure and the four-step random access procedure. If a preamble counter is independently used for a preamble in MsgA of the two-step random access procedure, the preamble counter is set to 1 after the terminal device switches to the bandwidth B. A name of the preamble counter may be MSGA_TRANSMISSION_COUNTER. This application is not limited thereto.

Case 10

The terminal device sets a preamble power ramping counter (PREAMBLE_POWER_RAMPING_COUNTER) to 1, so that a recorded value in a previous bandwidth does not affect normal communication on the bandwidth after the switching. The preamble power ramping counter is used to record a preamble power ramping count. The preamble power ramping counter may be a preamble power ramping counter of a four-step random access procedure, or may be a preamble power ramping counter shared by a two-step random access procedure and the four-step random access procedure. If a power ramping counter is independently used for a preamble in MsgA of the two-step random access procedure, the preamble power ramping counter is set to 1 after the terminal device switches to the bandwidth B. A name of the preamble power ramping counter may be MsgA_PREAMBLE_POWER_RAMPING_COUNTER. This application is not limited thereto.

Case 11

The terminal device sets a PUSCH power ramping counter in MsgA of a two-step random access procedure to 1, so that a recorded value in a previous bandwidth does not affect normal communication on the bandwidth after the switching. The power ramping counter is used to record a PUSCH power ramping count in MsgA. A name of the PUSCH power ramping counter may be MsgA_PUSCH_POWER_RAMPING_COUNTER. This application is not limited thereto.

Case 12

The terminal device sets a backoff indicator (BI) to 0 ms. In this way, the terminal device can immediately initiate the random access procedure after switching to the bandwidth B, to reduce an access delay.

In a four-step random access procedure, the BI is used to indicate a range of time for which the terminal device needs to wait before retransmitting a preamble. If the terminal device does not receive an RAR within an RAR time window, or no preamble in a received RAR matches with the preamble sent by the terminal device, the terminal device determines that the RAR fails to be received. The terminal device needs to wait for a BI value before initiating random access. Waiting time is a random value selected from 0 to a waiting time interval specified by the BI. A name of the BI may be PREAMBLE_BACKOFF. This application is not limited thereto. A two-step random access procedure and the four-step random access procedure may share a same configured BI. To be specific, one BI configured by the network device for the terminal device is used for both the two-step random access procedure and the four-step random access procedure. Alternatively, the network device may separately configure, for the terminal device, a BI used for the four-step random access procedure and a BI used for the two-step random access procedure. The BI used for the two-step random access procedure and the BI used for the four-step random access procedure have a same or similar function. For brevity, details are not described herein.

It should be noted that, the preamble of the four-step random access procedure mentioned above is a random access preamble, and the preamble of the two-step random access is a random access preamble and/or a DMRS.

The methods provided in embodiments of this application are described above in detail with reference to FIG. 2 and FIG. 3. Apparatuses provided in embodiments of this application are described below in detail with reference to FIG. 4 to FIG. 6.

Figure 4:
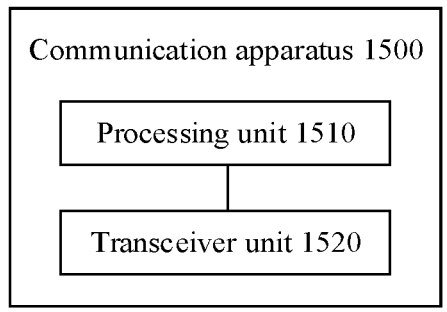
FIG. 4 is a schematic block diagram of an example of a wireless communication apparatus applicable to an embodiment of this application.

FIG. 4 is a schematic block diagram of a communication apparatus according to an embodiment of this application. As shown in FIG. 4, the communication apparatus 1500 may include a processing unit 1510 and a transceiver unit 1520.

In a possible design, the communication apparatus 1500 may correspond to the terminal device in the foregoing method embodiments, for example, may be a terminal device or a chip disposed in the terminal device.

It should be understood that the communication apparatus 1500 may correspond to the terminal device in the methods according to embodiments of this application, and the communication apparatus 1500 may include units configured to perform the method performed by the terminal device in the method 200 in FIG. 2 and the method 300 in FIG. 3. In addition, the units in the communication apparatus 1500 and the foregoing other operations and/or functions are respectively used to implement corresponding procedures in the methods 200 and 300 in FIG. 2 and FIG. 3.

When the communication apparatus 1500 is configured to perform the method 200 in FIG. 2, the transceiver unit 1520 may be configured to perform S210 in the method 200, and the processing unit 1510 may be configured to perform S220 and S230 in the method 200. When the communication apparatus 1500 is configured to perform the method 300 in FIG. 3, the processing unit 1510 may be configured to perform S310, S320, and S330 in the method 300. It should be understood that, a specific process in which each unit performs the foregoing corresponding step has been described in detail in the foregoing method embodiments. For brevity, details are not described herein again.

Figure 5:
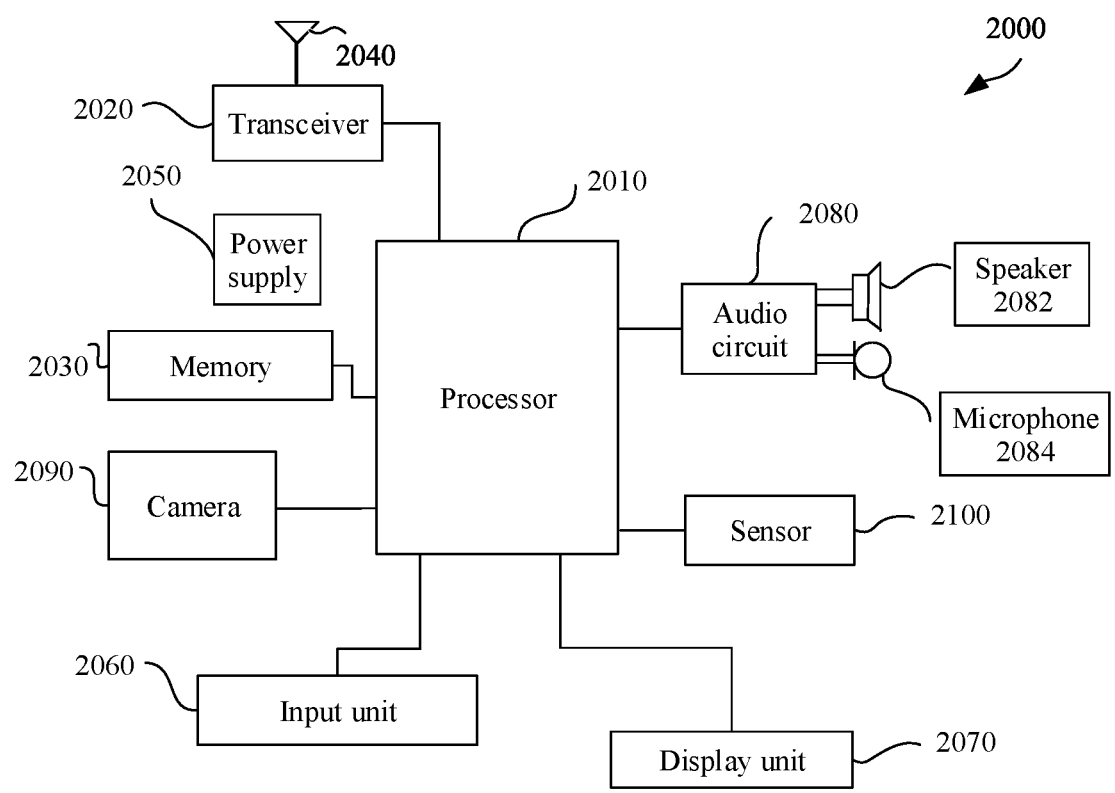
FIG. 5 is a schematic diagram of an example of a structure of a terminal device applicable to an embodiment of this application.

It should be further understood that, when the communication apparatus 1500 is the terminal device, the transceiver unit 1520 in the communication apparatus 1500 may correspond to a transceiver 2020 in a terminal device 2000 shown in FIG. 5, and the processing unit 1510 in the communication apparatus 1500 may correspond to a processor 2010 in the terminal device 2000 shown in FIG. 5.

It should be further understood that when the communication apparatus 1500 is the terminal device, the transceiver unit 1520 in the communication apparatus 1500 may be implemented by using a communication interface (for example, a transceiver or an input/output interface), for example, may correspond to the transceiver 2020 in the terminal device 2000 shown in FIG. 5, and the processing unit 1510 in the communication apparatus 1500 may be implemented by using at least one processor, for example, may correspond to the processor 2010 in the terminal device 2000 shown in FIG. 5, or the processing unit 1510 in the communication apparatus 1500 may be implemented by using at least one logical circuit.

Optionally, the communication apparatus 1500 may further include the processing unit 1510. The processing unit 1510 may be configured to process instructions or data, to implement a corresponding operation.

Optionally, the communication apparatus 1500 may further include a storage unit. The storage unit may be configured to store instructions or data. The processing unit may invoke the instructions or the data stored in the storage unit, to implement a corresponding operation.

It should be understood that, a specific process in which each unit performs the foregoing corresponding step has been described in detail in the foregoing method embodiments. For brevity, details are not described herein again.

In another possible design, the communication apparatus 1500 may correspond to the network device in the foregoing method embodiments, for example, may be a network device or a chip disposed in the network device.

It should be understood that the communication apparatus 1500 may correspond to the network device in the method 200 according to embodiments of this application, and the communication apparatus 1500 may include a unit configured to perform the method performed by the network device in the method 200 in FIG. 2. In addition, the units in the communication apparatus 1500 and the foregoing other operations and/or functions are respectively used to implement corresponding procedures in the methods 200 and 300 in FIG. 2 and FIG. 3.

When the communication apparatus 1500 is configured to perform the method 200 in FIG. 2, the transceiver unit 1520 may be configured to perform S210 in the method 200. It should be understood that, a specific process in which each unit performs the foregoing corresponding step has been described in detail in the foregoing method embodiments. For brevity, details are not described herein again.

Figure 6:
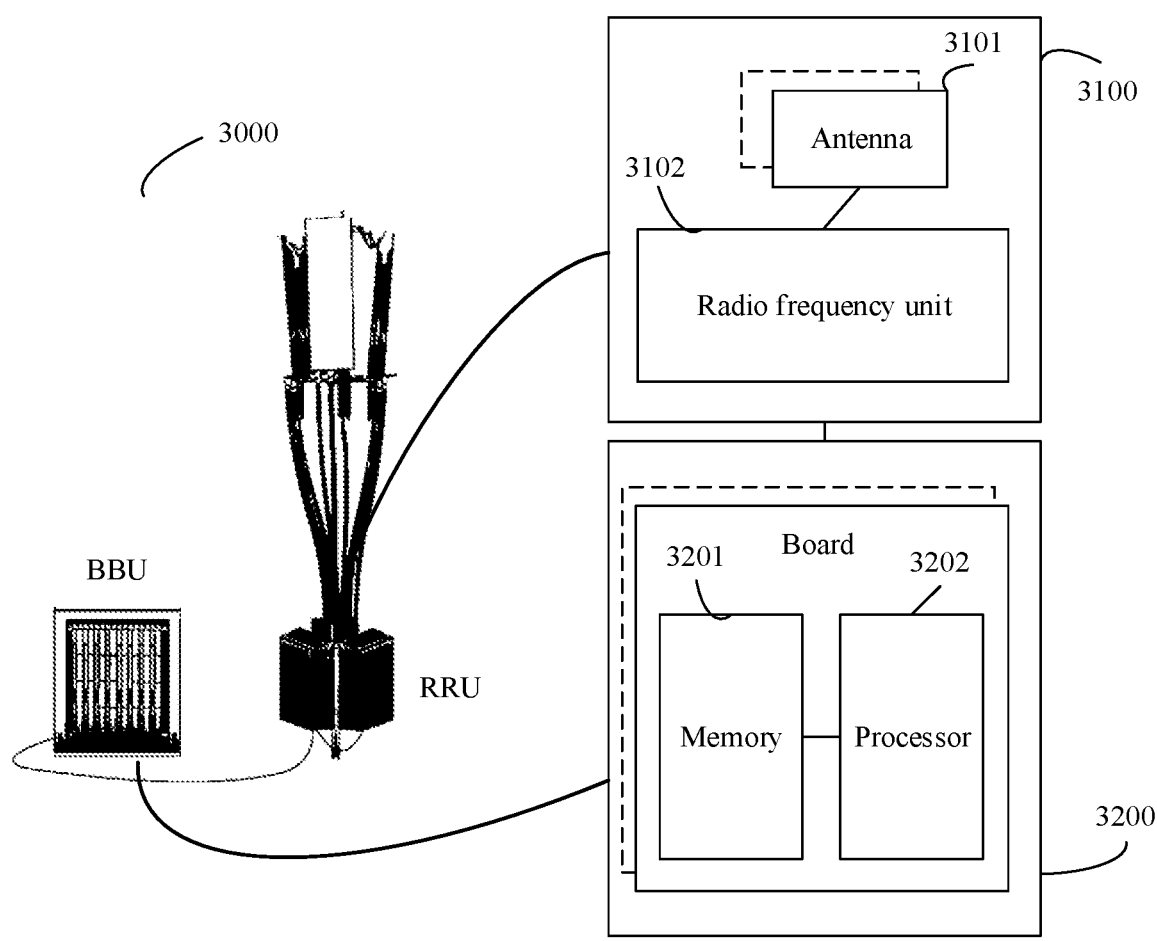
FIG. 6 is a schematic diagram of an example of a structure of a network device applicable to an embodiment of this application.

It should be further understood that, when the communication apparatus 1500 is the network device, the transceiver unit in the communication apparatus 1500 may correspond to the transceiver 3100 in the network device 3000 shown in FIG. 6, and the processing unit 1510 in the communication apparatus 1500 may correspond to the processor 3202 in the network device 3000 shown in FIG. 6.

Optionally, the communication apparatus 1500 may further include the processing unit 1510. The processing unit 1510 may be configured to process instructions or data, to implement a corresponding operation.

Optionally, the communication apparatus 1500 may further include a storage unit. The storage unit may be configured to store instructions or data. The processing unit may invoke the instructions or the data stored in the storage unit, to implement a corresponding operation.

It should be understood that, a specific process in which each unit performs the foregoing corresponding step has been described in detail in the foregoing method embodiments. For brevity, details are not described herein again.

It should be further understood that when the communication apparatus 1500 is the network device, the transceiver unit 1520 in the communication apparatus 1500 may be implemented by using a communication interface (for example, a transceiver or an input/output interface), for example, may correspond to the transceiver 3100 in the network device 3000 shown in FIG. 6, and the processing unit 1510 in the communication apparatus 1500 may be implemented by using at least one processor, for example, may correspond to the processor 3202 in the network device 3000 shown in FIG. 6, or the processing unit 1510 in the communication apparatus 1500 may be implemented by using at least one logical circuit.

FIG. 5 is a schematic diagram of a structure of a terminal device 2000 according to an embodiment of this application. The terminal device 2000 may be used in the system shown in FIG. 1, to perform a function of the terminal device in the foregoing method embodiments. As shown in the figure, the terminal device 2000 includes a processor 2010 and a transceiver 2020. Optionally, the terminal device 2000 further includes a memory 2030. The processor 2010, the transceiver 2020, and the memory 2030 may communicate with each other through an internal connection path, to transfer a control signal and/or a data signal. The memory 2030 is configured to store a computer program. The processor 2010 is configured to invoke and run the computer program in the memory 2030, to control the transceiver 2020 to receive or send a signal. Optionally, the terminal device 2000 may further include an antenna 2040, configured to send, by using a radio signal, uplink data or uplink control signaling output by the transceiver 2020.

The processor 2010 and the memory 2030 may be integrated into one processing apparatus. The processor 2010 is configured to execute program code stored in the memory 2030 to implement the foregoing functions. During specific implementation, the memory 2030 may alternatively be integrated into the processor 2010, or may be independent of the processor 2010. The processor 2010 may correspond to the processing unit in FIG. 4.

The transceiver 2020 may correspond to the transceiver unit in FIG. 4. The transceiver 2020 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that the terminal device 2000 shown in FIG. 5 can implement each process related to the terminal device in the method embodiments shown in FIG. 2 and FIG. 3. Operations and/or functions of the modules in the terminal device 2000 are intended to implement the corresponding procedures in the foregoing method embodiments. For details, refer to the descriptions in the foregoing method embodiments. To avoid repetition, detailed descriptions are properly omitted herein.

The processor 2010 may be configured to perform an action that is implemented inside the terminal device and that is described in the foregoing method embodiments. The transceiver 2020 may be configured to perform a sending action by the terminal device for the network device or a receiving operation from the network device in the foregoing method embodiments. For details, refer to the descriptions in the foregoing method embodiments. Details are not described herein again.

Optionally, the terminal device 2000 may further include a power supply 2050, configured to supply power to various components or circuits in the terminal device.

In addition, to improve the functions of the terminal device, the terminal device 2000 may further include one or more of an input unit 2060, a display unit 2070, an audio circuit 2080, a camera 2090, a sensor 2100, and the like, and the audio circuit may further include a speaker 2082, a microphone 2084, and the like.

FIG. 6 is a schematic diagram of a structure of a network device according to an embodiment of this application, for example, may be a schematic diagram of a related structure of the network device.

It should be understood that the network device 3000 shown in FIG. 6 can implement each process related to the network device in the method embodiment shown in FIG. 2. Operations and/or functions of modules in the network device 3000 are intended to implement corresponding procedures in the foregoing method embodiments. For details, refer to the descriptions in the foregoing method embodiments. To avoid repetition, detailed descriptions are properly omitted herein.

It should be understood that the network device 3000 shown in FIG. 6 is merely a possible architecture of the network device, and should not constitute any limitation on this application. The method provided in this application is applicable to a network device in another architecture, for example, a network device including a CU, a DU, and an AAU. A specific architecture of the network device is not limited in this application.

An embodiment of this application further provides a processing apparatus, including a processor and an interface. The processor is configured to perform the method in any one of the foregoing method embodiments.

It should be understood that, the processing apparatus may be one or more chips. For example, the processing apparatus may be a field programmable gate array (FPGA), an application-specific integrated chip (ASIC), a system on chip (system on chip, SoC), a central processing unit (CPU), a network processor (NP), a digital signal processing circuit (digital signal processor, DSP), a microcontroller unit (MCU), a programmable controller (programmable logic device, PLD), or another integrated chip.

In an implementation process, the steps in the foregoing methods can be implemented by using a hardware integrated logic circuit in the processor, or by using instructions in a form of software. The steps of the method disclosed with reference to embodiments of this application may be directly performed by a hardware processor, or may be performed by a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory. The processor reads information in the memory, and completes the steps of the foregoing method in combination with hardware of the processor. To avoid repetition, details are not described herein again.

It should be noted that, the processor in this embodiment of this application may be an integrated circuit chip, and has a signal processing capability. In an implementation process, the steps in the foregoing methods can be implemented by using a hardware integrated logic circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps of the method disclosed with reference to embodiments of this application may be directly performed by a hardware processor, or may be performed by a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory. The processor reads information in the memory, and completes the steps of the foregoing method in combination with hardware of the processor.

It may be understood that the memory in embodiments of this application may be a volatile memory or a non-volatile memory, or may include both the volatile memory and the non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through examples rather than limitative descriptions, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the system and method described in this specification includes but is not limited to these and any memory of another appropriate type.

According to the method provided in embodiments of this application, this application further provides a computer program product. The computer program product includes computer program code. When the computer program code is run on a computer, the computer is enabled to perform the methods in the embodiments shown in FIG. 2 and FIG. 3.

According to the method provided in embodiments of this application, this application further provides a computer-readable medium. The computer-readable medium stores program code. When the program code is run on a computer, the computer is enabled to perform the methods in the embodiments shown in FIG. 2 and FIG. 3.

According to the method provided in embodiments of this application, this application further provides a system. The system includes the foregoing one or more terminal devices and the foregoing one or more network devices.

The network device and the terminal device in the foregoing apparatus embodiments completely correspond to the network device and the terminal device in the method embodiments. A corresponding module or unit performs a corresponding step. For example, the communication unit (the transceiver) performs a receiving or sending step in the method embodiments, and a step other than the sending step and the receiving step may be performed by the processing unit (the processor). For a function of a specific unit, refer to a corresponding method embodiment. There may be one or more processors.

All or some of the foregoing embodiments may be implemented by using software, hardware, firmware, or any combination thereof. When being implemented by using the software, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (solid state disc, SSD)), or the like.

The network device and the terminal device in the foregoing apparatus embodiments completely correspond to the network device and the terminal device in the method embodiments. A corresponding module or unit performs a corresponding step. For example, the communication unit (the transceiver) performs a receiving or sending step in the method embodiments, and a step other than the sending step and the receiving step may be performed by the processing unit (the processor). For a function of a specific unit, refer to a corresponding method embodiment. There may be one or more processors.

Terms such as "component", "module", and "system" used in this specification are used to indicate a computer-related entity, hardware, firmware, a combination of hardware and software, software, or software being executed. For example, the component may be but is not limited to a process that runs on a processor, a processor, an object, an executable file, an execution thread, a program, and/or a computer. As illustrated by using figures, both a computing device and an application that runs on the computing device may be components. One or more components may reside within a process and/or an execution thread, and a component may be located on one computer and/or distributed between two or more computers. In addition, these components may be executed by various computer-readable media that store various data structures. The components may perform communication by using a local and/or remote process and based on, for example, a signal having one or more data packets (for example, data from two components interacting with another component in a local system, a distributed system, and/or across a network such as an internet interacting with another system by using the signal).

A person of ordinary skill in the art may be aware that, in combination with the examples described in embodiments disclosed in this specification, units and algorithm steps may be implemented by electronic hardware or a combination of computer software and the electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing systems, apparatuses, and units, refer to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. A part or all of the units may be selected based on actual requirements to achieve the objectives of the solutions of embodiments.

In addition, function units in embodiments of this application may be integrated into one processing unit, or each of the units may exist alone physically, or two or more units are integrated into one unit.

In the foregoing embodiments, all or some of the functions of the function units may be implemented by using software, hardware, firmware, or any combination thereof. When being implemented by using the software, all or some of the embodiments may be implemented in a form of a computer program product. The computer program product includes one or more computer instructions (programs). When the computer program instructions (programs) are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

When the functions are implemented in the form of a software function unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, implemented by a terminal device, the method comprising:
   performing a first random access procedure on a first bandwidth part of an active bandwidth,
      wherein the first random access procedure is a first two-step random access procedure or first four-step random access procedure;
   determining that a counter reaches a maximum value of a listen before talk (LBT) failure count, wherein the counter is configured to record a quantity of LBT failures;
   switching the active bandwidth from the first bandwidth part to a second bandwidth part;
   determining, based on a reference signal received power threshold, whether to initiate a second random access procedure on the second bandwidth part as a second two-step random access procedure or a second four-step random access procedure;
   initiating the second random access procedure on the second bandwidth part;
   keeping a buffer of the first random access procedure performed on the first bandwidth part,
      wherein the buffer is a MsgA buffer when the first random access procedure is the first two-step random access procedure, and
      wherein the buffer is a Msg3 buffer when the first random access procedure is the first four-step random access procedure;
   obtaining a packet from the Msg3 buffer based on initiating the second random access procedure on the second bandwidth part as the second four-step random access procedure or obtaining a packet from the MsgA buffer based on initiating the second random access procedure on the second bandwidth part as the second two-step random access procedure; and
   sending the packet without reassembling the packet.

2. The method according to claim 1, further comprising resetting a counter in response to switching to the second bandwidth part, wherein the counter is configured to record a quantity of LBT failures.

3. The method according to claim 2, further comprising:
   stopping a running timer configured to maintain the counter, wherein the timer is started or restarted in response to detecting an LBT failure during running of the timer.

4. The method according to claim 1, further comprising initializing the first random access procedure, wherein the initialization includes at least one of the following:
   setting a preamble transmission counter to 1;
   setting a preamble power ramping counter to 1; and
   setting a backoff indicator to 0, wherein the backoff indicator is used to indicate a range of time that needs to wait before retransmitting a preamble.

5. An apparatus comprising:
   a non-transitory memory storing processor-executable instructions; and
   one or more processors coupled to the memory, wherein the one or more processors execute the instructions and are configured to:

perform a first random access procedure on a first bandwidth part of an active bandwidth,
  wherein the first random access procedure is a first two-step random access procedure or first four-step random access procedure;
determine that a counter reaches a maximum value of a listen before talk (LBT) failure count;
switch the active bandwidth from the first bandwidth part to a second bandwidth part;
determine, based on a reference signal received power threshold, whether to initiate a second random access procedure on the second bandwidth part as a second two-step random access procedure or a second four-step random access procedure;
initiate the second random access procedure on the second bandwidth part;
keep a buffer of the first random access procedure performed on the first bandwidth part,
  wherein the buffer is a MsgA buffer when the first random access procedure is the first two-step random access procedure, and
  wherein the buffer is a Msg3 buffer when the first random access procedure is the first four-step random access procedure;
obtain a packet from the Msg3 buffer based on initiating the second random access procedure on the second bandwidth part as the second four-step random access procedure or obtain a packet from the MsgA buffer based on initiating the second random access procedure on the second bandwidth part as the second two-step random access procedure; and
send the packet without reassembling the packet.

6. The apparatus according to claim 5, wherein the one or more processors are further configured to reset a counter in response to switching to the second bandwidth part, wherein the counter is configured to record a quantity of LBT failures.

7. The apparatus according to claim 6, wherein the one or more processors are further configured to stop a running timer configured to maintain the counter, wherein the timer is started or restarted in response to detecting an LBT failure during running of the timer.

8. The apparatus according to claim 5, wherein the one or more processors are further configured to initialize the first random access procedure, wherein the initialization includes performing at least one of the following:
  setting a preamble transmission counter to 1;
  setting a preamble power ramping counter to 1; and
  setting a backoff indicator to 0, wherein the backoff indicator is used to indicate a range of time that needs to wait before retransmitting a preamble.

9. A non-transitory computer-readable storage medium comprising a program, which are executed by a processor and cause the processor to perform operations including:

performing a first random access procedure on a first bandwidth part of an active bandwidth,
  wherein the first random access procedure is a first two-step random access procedure or first four-step random access procedure;
determining that a counter reaches a maximum value of a listen before talk (LBT) failure count;
switching the active bandwidth from the first bandwidth part to a second bandwidth part;
determining, based on a reference signal received power threshold, whether to initiate a second random access procedure on the second bandwidth part as a second two-step random access procedure or a second four-step random access procedure;
initiating the second random access procedure on the second bandwidth part;
keeping a buffer of the first random access procedure performed on the first bandwidth part,
  wherein the buffer is a MsgA buffer when the first random access procedure is the first two-step random access procedure, and
  wherein the buffer is a Msg3 buffer when the first random access procedure is the first four-step random access procedure;
obtaining a packet from the Msg3 buffer based on initiating the second random access procedure on the second bandwidth part as the second four-step random access procedure or obtaining a packet from the MsgA buffer based on initiating the second random access procedure on the second bandwidth part as the second two-step random access procedure; and
sending the packet without reassembling the packet.

10. The non-transitory computer-readable storage medium according to claim 9, wherein the operations further comprise: resetting a counter in response to switching to the second bandwidth part, wherein the counter is configured to record a quantity of LBT failures.

11. The non-transitory computer-readable storage medium according to claim 10, wherein the operations further comprise:
  stopping a running timer configured to maintain the counter, wherein the timer is started or restarted in response to detecting an LBT failure during running of the timer.

12. The non-transitory computer-readable storage medium according to claim 9, wherein the operations further comprise: initializing the first random access procedure, wherein the initialization includes performing at least one of the following:
  setting a preamble transmission counter to 1;
  setting a preamble power ramping counter to 1; and
  setting a backoff indicator to 0, wherein the backoff indicator is used to indicate a range of time that needs to wait before retransmitting a preamble.

* * * * *